United States Patent
Lu et al.

(10) Patent No.: US 8,224,102 B2
(45) Date of Patent: Jul. 17, 2012

(54) METHOD FOR ENCODING A PICTURE, COMPUTER PROGRAM PRODUCT AND ENCODER

(75) Inventors: Zhongkang Lu, Singapore (SG); Weisi Lin, Singapore (SG); Zhengguo Li, Singapore (SG); Keng Pang Lim, Singapore (SG); Xiao Lin, Singapore (SG); Susanto Rahardja, Singapore (SG); Ee Ping Ong, Singapore (SG); Susu Yao, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 812 days.

(21) Appl. No.: 11/910,929

(22) PCT Filed: Apr. 6, 2006

(86) PCT No.: PCT/SG2006/000088
§ 371 (c)(1),
(2), (4) Date: Feb. 27, 2009

(87) PCT Pub. No.: WO2006/107280
PCT Pub. Date: Oct. 12, 2006

(65) Prior Publication Data
US 2009/0324113 A1    Dec. 31, 2009

(51) Int. Cl.
*G06K 9/36* (2006.01)
(52) U.S. Cl. .................................................. 382/232
(58) Field of Classification Search .......... 382/232–251; 375/240.1–240.29; 348/390.1–425.1
See application file for complete search history.

(56) References Cited

U.S. PATENT DOCUMENTS

| | | | |
|---|---|---|---|
| 5,214,507 A * | 5/1993 | Aravind et al. | 348/390.1 |
| 6,097,757 A | 8/2000 | Boice et al. | 375/240 |
| 6,256,423 B1 * | 7/2001 | Krishnamurthy et al. | 382/251 |
| 6,269,193 B1 * | 7/2001 | Young et al. | 382/244 |
| 6,864,909 B1 | 3/2005 | Horowitz | 348/14.12 |
| 7,162,095 B2 * | 1/2007 | Chen et al. | 382/240 |
| 2002/0141650 A1 | 10/2002 | Keeney et al. | 382/239 |
| 2006/0204113 A1 * | 9/2006 | Wang et al. | 382/236 |
| 2006/0256858 A1 * | 11/2006 | Chin | 375/240.03 |

FOREIGN PATENT DOCUMENTS
WO    WO 99/19839    4/1999
WO    WO 2004/043054    5/2004

OTHER PUBLICATIONS

Zhongkang Lu, W. S. Lin, E. P. Ong, Susu Yao and S. Rahardja, *Modelling Global modulatory factors in Just-Noticeable-Distortion Estimation*, First International Workshop on Video Processing and Quality Metrics for Consumer Electronics, Scottsdale, Arizona, Jan. 2005.
ISO/ISC JTC 1/SC 29/WG 1 (ITU-T SG8) JPEG2000 Part Final Committee Draft Version 1.0, Mar. 2000.

* cited by examiner

*Primary Examiner* — Ishrat I Sherali
(74) *Attorney, Agent, or Firm* — K. David Crockett, Esq.; Crockett & Crockett, PC (57) ABSTRACT

A Method for encoding a picture with a first region and a second region is described wherein the first region is encoded according to a first encoding scheme, the second region is encoded according to a second encoding scheme and the second encoding scheme is carried out taking a parameter representing the visual perception of the second region into account.

10 Claims, 5 Drawing Sheets

METHOD FOR ENCODING A PICTURE, COMPUTER PROGRAM PRODUCT AND ENCODER

BACKGROUND

The invention relates to a method for encoding a picture, a computer program product and an encoder.

Perceptual content-adaptive video/image communication (PCAVC) adapts the concept of visual attention into video compression. Human eyes are not perfect sensors. Some information is not visible to human eyes. The term "Just-Noticeable-Difference (JND)" indicates the tolerance that has a 50% possibility being able to be perceived by human eyes under certain conditions (visual sensitivity is the inversa of the modulated JND). Moreover, human eyes are also highly selective sensors. Their selectivity depends not only on local contents, but also global cognitive (high-level) contents. Their global selectivity reflects on the resource allocation competition on both low-level and high-level visual contents. The selectivity of human eyes is also called "visual attention".

It is believed that the computational resources in the human brain are limited. With millions of years of evolution, the mechanism of visual attention has developed in the human brain, a set of strategies to reduce the computational cost of the search processes inherent in visual perception.

By this mechanism, a human brain allocates more resources to one or more areas of the human's visual field, which contain the most important contents to human eyes. Determining what content is more important than another is a competition process.

Visual attention is a very important and complex mechanism of the human brain. It brings many aftereffects. One of the most important aftereffects of visual attention is its modulatory effect on visual sensitivity. The characteristics of visual attention's aftereffect on visual sensitivity can be outlined as:
1. Generally, visual sensitivity in the area of high visual attention is high;
2. Visual sensitivity is also determined by local complexity of contents;
3. The difference of sensitivity thresholds between focus areas and out-of-focus areas can reach 9 dB in maximum;
4. The difference of the sensitivity is controlled by visual attention level, which is a result of both top-down stimuli (high-level contents, knowledge and experience) and bottom-up stimuli (low-level contents: contrast, color, orientation, etc);
5. Human eyes are not blind out of focus;
6. There usually exists a gradient for the sensitivity thresholds between focus areas and out-of-focus areas;
7. The gradient width usually is flexible and it is controlled by the visual attention level in a focus area; when the visual attention level is high, the gradient width is small, and vice versa;
8. The movement of object brings motion suppression:
    a. motion suppression usually only exists in out-of-focus areas;
    b. motion suppression is usually strong when the moving offset is big;
motion suppression can reach 6 dB in maximum.

Region of interest techniques are known according to prior art, see for example [3]. For example, an image is coded and transmitted in such a way that for a certain part of the image (the region of interest) a better visual quality is achieved than for the rest of the image.

The existing region of interest techniques have the following shortcomings:
1. The distortion inside the region of interest is zero (i.e. lossless compression is used for the region of interest, cf. [3]), and the information of an image corresponding to areas outside the region of interest may totally be lost in low and very-low bitrate conditions.
2. The ratio of distortion between the inside and the outside of the region of interest cannot be controlled.

An object of the invention is to provide an enhanced compression method compared to the compression methods according to prior art.

SUMMARY OF THE INVENTION

The object is achieved by a method for encoding a picture, a computer program product and an encoder with the features according to the independent claims.

A method for encoding at least one picture having a first region and a second region is provided wherein the first region is encoded according to a first encoding scheme, the second region is encoded according to a second encoding scheme and the second encoding scheme is carried out taking into account a parameter representing the visual perception of the second region.

Further, a computer program product and an encoder according to the encoding method described above are provided.

Illustrative embodiments of the invention are explained below with reference to the drawings.

DETAILED DESCRIPTION

According to one embodiment of the invention, the first region is a region of interest.

In one embodiment, a ROI-based (region of interest based) method is provided for encoding a picture which is based upon the distribution of visual sensitivity (in the following denoted by $\psi$) corresponding to the picture.

The sensitivity difference of picture elements inside the region of interest and outside the region of interest is determined by the visual attention level, the size and the shape of region of interest.

In one embodiment, a flexible gradient of visual attention is used, in contrast to prior art methods, where no gradient or a fixed gradient is used. The width of the gradient is also determined by visual attention level. Based on these characteristics, a number of perceptual region of interest processing schemes are used, which are explained below.

A major difference to known ROI-based video/image communication schemes can be seen in that a new parameter is introduced to control the allocation of computational resource and bit-rate in a more accurate way, following the characteristics of Human Visual System (HVS), for example the regions that are located outside the region(s) of interest.

In one embodiment a perceptual region-of-interest representation, is used which includes:

a) A region descriptor;
b) A parameter indicating the perceptual quality significance between the region of interest and the background (the remaining part of the picture);
c) A parameter indicating the type of gradient functions, which can be a linear or nonlinear function; and
d) A parameter indicating the width of gradient function. The default value of this parameter has an inversa relationship with parameter b).

The embodiments which are described in the context of the encoding method are analogously valid for the computer program product and the encoder.

In one embodiment, the first encoding scheme is carried out not taking the parameter into account. However, the first encoding scheme can also be carried out taking the parameter into account.

In one embodiment, the first region is represented by a perceptual region-of-interest representation from which a simplified perceptual quality significance map (PQSM) can be determined.

The PQSM can be used to adjust motion estimation when encoding a sequence of pictures, i.e., a video. The simplified PQSM can be used as an input of fast motion selection techniques. Further, motion vector precision can be adjusted using the simplified PQSM or other parameters influenced by simplified PQSM. Moreover, maximal search range can be adjusted using the simplified PQSM or other parameters can be influenced using the simplified PQSM. For example, motion estimation termination thresholds (or similar parameters) can be determined based on the simplified PQSM.

In one embodiment wherein MCTF+RDO (motion compensated temporal filter+rate distortion optimization) is used, the simplified PQSM is used to adjust lambda values.

In one embodiment (e.g. wherein a discrete cosine transform is used) the quantization parameters used for encoding the second region are adjusted according to the parameter.

In one embodiment (e.g. wherein a wavelet transform is used) the shifting values used for encoding the second region are adjusted according to the parameter.

According to one embodiment, a method to control the adaptive framerate selection in one frame of video, and a labeling technique to indicate the valid motion estimation regions is used, as described below.

In another embodiment the spatial scalability and the signal-noise-ratio (SNR) scalability in scalable video coding schemes are controlled based on PQSM.

A perfect compression technique should follow the mechanisms of the human visual system. It should have the ability to try to balance the distortions inside and outside of focus areas. This is also the best way to achieve highest compression ratio when the perceptual quality of the compressed video/image is fixed, or to achieve the best perceptual visual quality when the compression ratio is fixed.

The encoder can be adapted according to the MPEG (Moving Pictures Expert Group) standard or the H.264 standard (except for the functionalities according to the invention).

Figure 1:
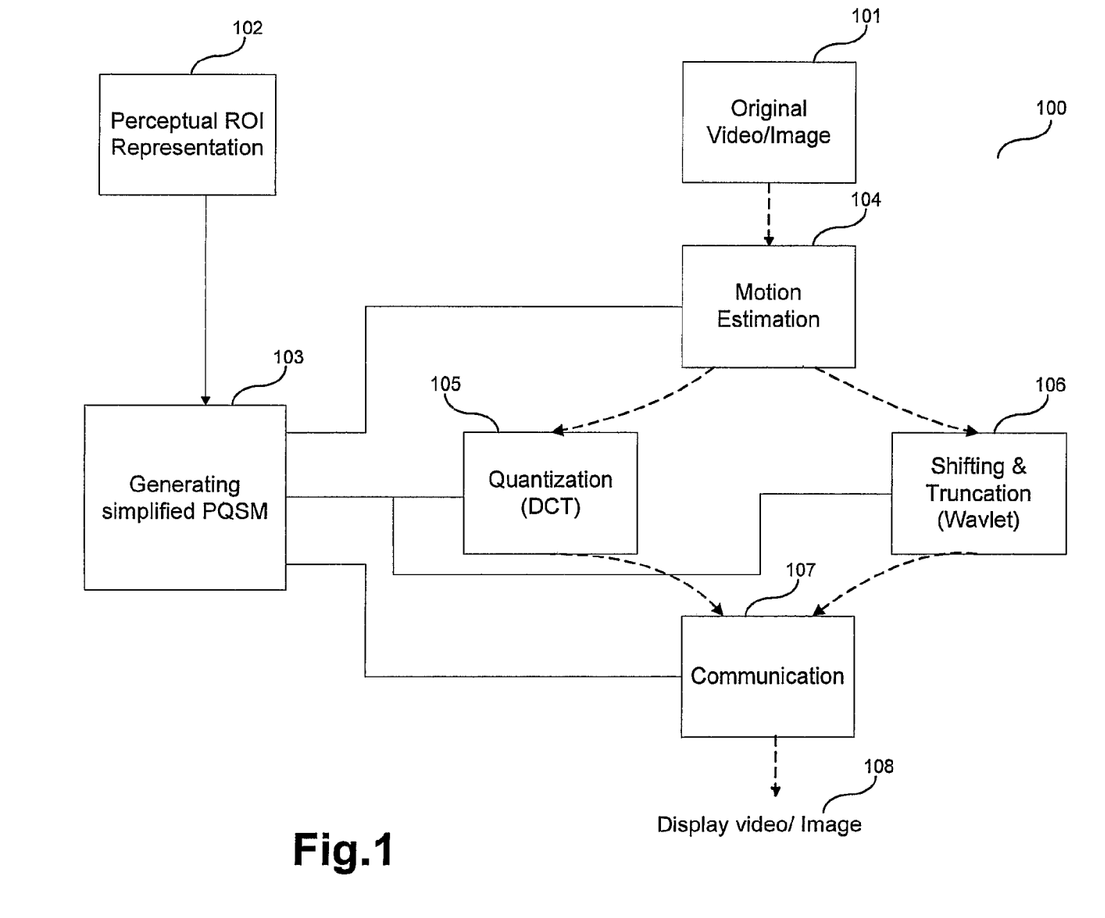
FIG. 1 shows a flow diagram for an encoding method according to an embodiment of the invention.

FIG. 1 shows a flow diagram 100 for an encoding method according to an embodiment of the invention.

The encoding method is used to encode an original video data stream 101 (or a still image) comprising one or a plurality of video images. A perceptual region of interest (ROI) representation 102 for the original video data stream 101 is used in the encoding method. The region of interest may be different for different frames of the original video data stream 101.

In step 103, a simplified perceptual quality significance map (PQSM) is generated from the perceptual ROI representation 102.

Using the PQSM, a motion estimation is performed in step 104 for the original video data stream 101. The results of the motion estimation are used to calculate corresponding residuals (reduce temporal redundancy) and a DCT (discrete cosine transform) is performed on the residuals in step 105. The resulting DCT coefficients are quantized.

Alternatively to the DCT, a Wavelet transform is performed in step 106. Corresponding shifting and truncation operations are carried out.

Step 105 and step 106 are carried out using the PQSM, as will be explained below.

After that, the encoding process is finished and the video data stream is in this embodiment transmitted to a receiver (comprising a corresponding decoder) in step 107. After the transmission and corresponding decoding operations (comprising inverse quantization and inverse discrete cosine transform) have been carried out, the video data stream is displayed in step 108.

Step 107 is also performed using the PQSM generated in step 103.

In this context, let I denote an image of the original video data stream 101, and Ĩ denote the associated distorted image of the video displayed in step 108. D=|I−Ĩ| represents distribution of distortion (Note that D=D(x,y) where x,y are the coordinates of the image and analogously for I=I(x,y) and Ĩ=Ĩ(x,y); the image coordinates are omitted in the following for simplicity).

Let P denote the Perceptual Quality Significance Map (PQSM) generated in step 103.

The distribution of computational resources $\mathcal{R}$, the distribution of visual sensitivity $\psi$, and the distribution of perceptual distortion $D_P$ follows the equations:

$$\mathcal{R} = \alpha \cdot P^\beta \qquad (1)$$

$$\Psi = \frac{P}{C} \qquad (2)$$

$$D_P = \frac{\gamma \cdot P \cdot D}{C} = \gamma \cdot \psi \cdot D = \frac{\kappa \cdot \mathcal{R}1/\beta \cdot D}{C} \qquad (3)$$

where $\alpha$, $\beta$, $\gamma$ and $\kappa>0$ are constants, and C is a measure of local complexity which represents the effect of local contrast masking, orientation masking and luminance adaptation. Here, a high value of C represents a high tolerance of distortion. The implication of equation (2) is that with a high amount of computational resources allocated on a region with high local complexity, the perceptual distortion on the region is low.

Equations (1) and (2) can be considered as the foundation of the proposed PCAVC scheme according to the encoding method described, since the main idea of the PCAVC scheme is to allocate available resource (bit rate, computational power, etc.) according to the distribution of $\psi$.

A perceptual quality significance map can be estimated automatically (see [1], [2]), or can be pre-defined manually.

For DCT-based image/video compression techniques, as applied in step 105, the introduced distortion is mainly determined by the quantization step Q, so:

$$Q = C_1/\psi \qquad (4)$$

where $C_1$ is a constant.

For wavelet-based image/video compression techniques, as applied in step 106, the introduced distortion is mainly determined by the shifting values S:

$$S = C_2 \cdot \psi \quad (5)$$

where $C_2$ is a constant.

Other parameters (besides S and/or Q) used in the encoding method illustrated in FIG. 1, which have effects on the resource allocation, are controlled by P. The parameters or techniques controlled using P are for example:

1. Fast mode selection;
2. The accuracy of motion vectors;
3. The maximal search range;
4. The Lagrangian Multiplier λ in a MCTF+RDO (motion compensated temporal filter+rate distortion optimization) scheme;
5. The punctured convolutional codes (PCCs) used in error resilient communication scheme;
6. Adaptive framerate control;
7. ROI-based spatial scalability; and
8. ROI-based SNR scalability.

However, since it is not practical, the whole ψ is not introduced directly into the image/video compression techniques, i.e. the encoding method. The compression and transmission of ψ would otherwise cost a lot of precious resources, especially bit-rate.

The perceptual ROI representation 102 is given by the following:

1. R: ROI mask, with R(x, y)=1 indicating that the block (i.e. a block of pixels of the picture) with the coordinates (x, y) belongs to ROI, and R(x, y)=0 indicating that the block (x, y) is out-of-ROI, i.e. does not belong to the region of interest.
2. $P^{va}$: a parameter indicating a measure (maximum/average/minimum) of PQSM in ROI. In all cases, $P^{va} > 1$ holds.
0.3. $T^{grad}$: parameter specifying the type of gradient function used.
4. W: a measure of gradient width, which has a inversa relationship to $P^{va}$.

So, the proposed perceptual ROI representation is a collection of above items: PROI={R,$P^{va}$,$T^{grad}$,W}.

The differences between known ROI representations and the preceptual ROI representation 102 is the introduction of $P^{va}$ and the two parameters $T^{grad}$ and W. The overhead introduced with the preceptual ROI representation 102 is therefore negligible.

W can be controlled using $P^{va}$. This is of advantage, since it has been found out in biological and psychophysical researches that the gradient of visual attention is dependent on the visual attentional level of the area. Moreover, $T^{grad}$ can be pre-defined in the encoder and the decoder, respectively, so only R and $P^{va}$ can be transferred in the image/video bitstream (in course of the transmission performed in step 107). For some specified applications, even R and $P^{va}$ can be pre-defined in encoder and decoder.

In one embodiment, the ROI coding method used in JPEG-2000 or the alpha-plane coding method used in MPEG-4 are adopted directly. There is only one additional parameter (namely $P^{va}$) that needs to be added into the bitstream generated according to these methods.

Figure 2:
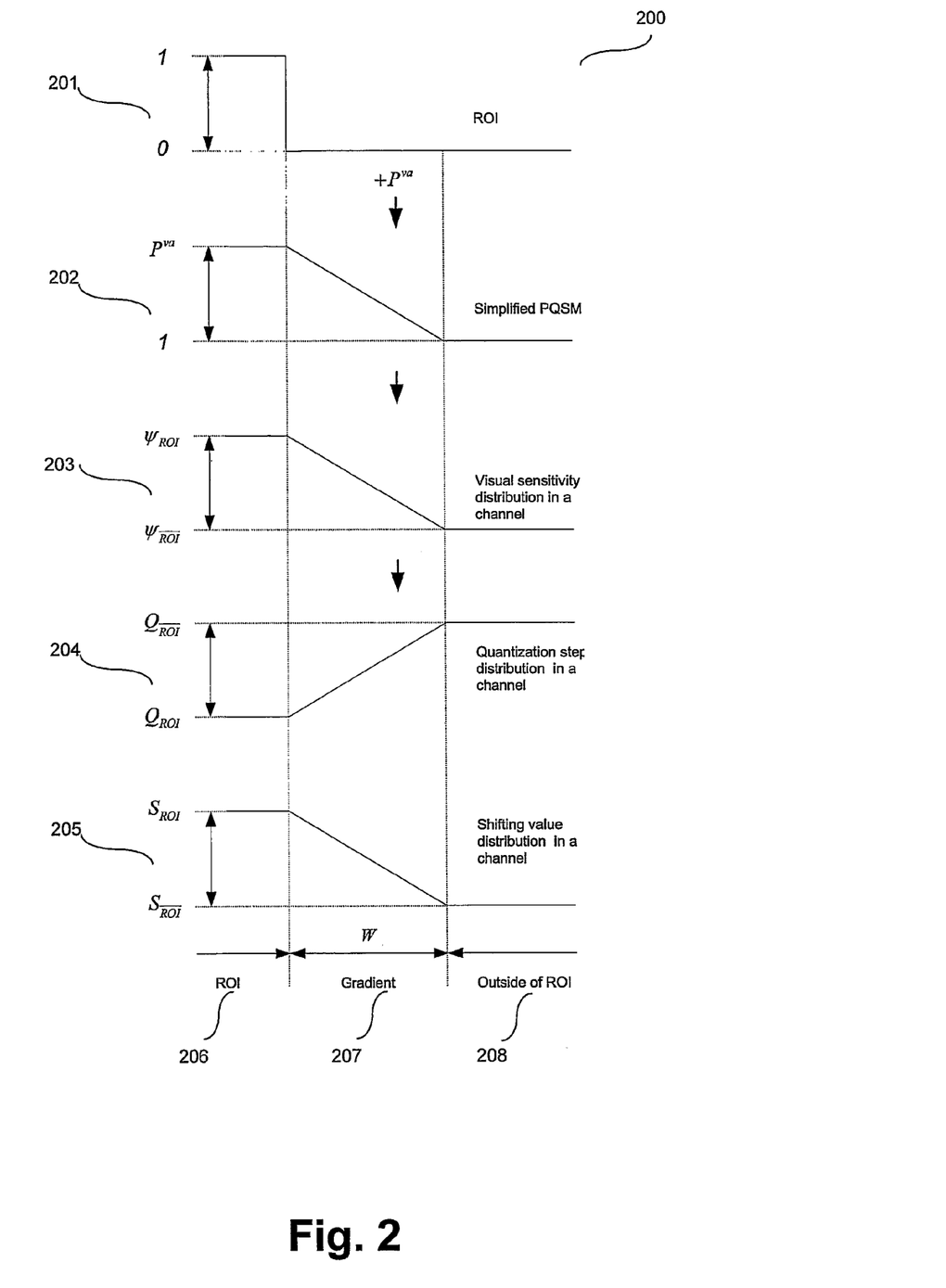
FIG. 2 illustrates some parameters calculated in course of the encoding process according to an embodiment of the invention.

FIG. 2 illustrates some parameters calculated in course of the encoding process according to an embodiment of the invention.

A first diagram 201 shows the ROI mask R. In the horizontal direction, the location on the picture (e.g. video frame) changes (for the simplicity of the illustration, only one geometric dimension is shown). The region of interest is illustrated by a first area 206, the gradient belt is illustrated by a second area 207, the outside of the region of interest is illustrated by a third area 208.

In a second diagram 202, the simplified PQSM P is illustrated which is determined as described below. A third diagram 203 illustrates the visual sensitivity distribution, a fourth diagram 204 illustrates the quantization step distribution and a fifth diagram 205 illustrates the shifting value distribution which are calculated from the simplified PQSM P.

In this simple example, the equation $$\frac{\psi_{ROI}}{\psi_{\overline{ROI}}} = \frac{Q_{\overline{ROI}}}{Q_{ROI}} = \frac{S_{ROI}}{S_{\overline{ROI}}}$$

holds.

In the vertical direction, the magnitude of R changes. The other diagrams shown in FIG. 2 are drawn analogously.

From the given ROI mask R and parameter $P^{va}$, the simplified PQSM P illustrated by the second diagram 202 is calculated. P is used to modulate quantization parameters, shifting values and other resources for the video (or image) compression and communication.

The simplified PQSM P is obtained by following equations:

$$P_{ROI} = P^{va} \quad (6)$$

$$P_{\overline{ROI}} = 1 \quad (7)$$

$$W = f_w(P^{va}) \quad (8)$$

$$P_{grad} = g_{grad}(P^{va}, W) \quad (9)$$

where $P_{ROI}$ represents the quantization step inside the region of interest (first area 206), $P_{\overline{ROI}}$, represents the quantization step outside the region of interest (third area 208) and $P_{grad}$ represents the quantization step on the gradient belt (second area 207). $g_{grad}( )$ is the gradient function, and the function $f_W( )$ controls the width of the gradient belt.

Figure 3:
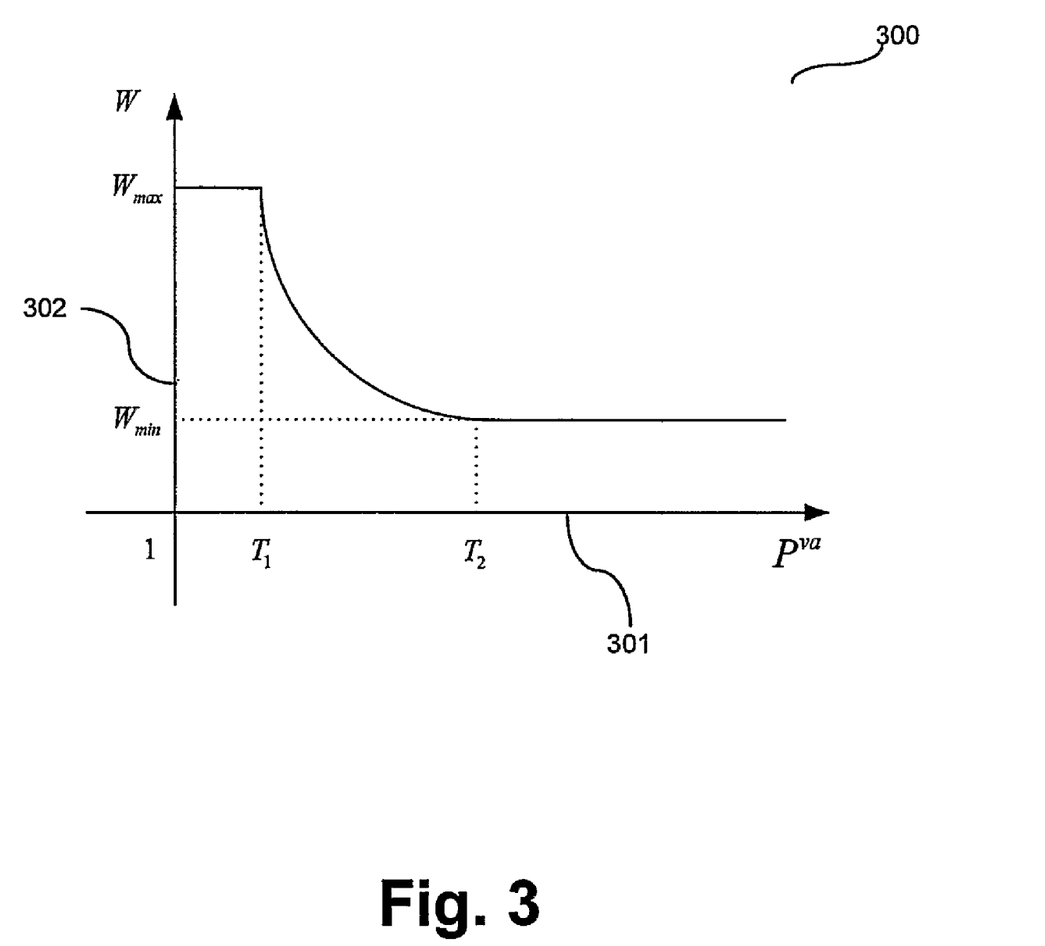
FIG. 3 shows an example of a linear gradient function according to an embodiment of the invention.

FIG. 3 shows an example of a linear gradient function 300 according to an embodiment of the invention. The x-axis 301 corresponds to the parameter $P^{va}$ and the y-axis corresponds to the parameter W, which changes between a minimum value $W_{min}$ and a maximum value $W_{max}$.

Other gradient functions can also be used in the scheme, for example the retinal eccentricity function (see [4]):

$$CT(e, P^{va}) = CT_0 e^{\left(\frac{\eta}{P^{va}} f \frac{e+e_2}{e_2}\right)} \quad (10)$$

where $$f = \frac{D_r}{d_{eye-screen}}$$

is spatial frequency (cycles/degree). $D_r$ is the resolution of the display (cycles/inch), and $d_{eye-screen}$ is the distance from eye to display screen (inch), each plane in wavelet domain has each own f;

$$e = \frac{d_{(x,y)-ROI}}{d_{eye-screen} \cdot D_r}$$

is retinal eccentricity (degrees), $d_{(x,y)-ROI}$ is the distance from (x,y) to ROI (cycles);
$CT_0$ minimal contrast threshold;
η spatial frequency decay constant;
$e_2$ half-resolution eccentricity constant;
$CT(e, P^{va})$ visible contrast threshold as a function of e and $P^{va}$.

When a video frame contains multiple perceptual region of interests $PROI_i = \{R_i, P_i^{va}, T_i^{grad}, W_i\}$, i=1, 2, ..., N, then $$P(x, y) = \max_i (P_i(x, y)) \qquad (11)$$

is set where $P_i(x, y)$ is estimated by ROI $PROI_i$ only.

With multiple regions of interest, the generated simplified PQSM is closer to actual PQSM.

In the case that a DCT is performed according to step 105, quantization parameters for the DCT-based Compression are adjusted according to the following perceptual ROI-based scheme.

The inputs of the DCT-based single perceptual ROI compression scheme include:
1. I: original image;
2. $Q^{init}$: Initial quantization parameter, which can be pre-defined or obtained by a rate-control scheme; and
3. ROI representation (or representation of multiple ROIs, see above)

The quantization step Q(x, y) can be obtained by:

$$Q(x, y) = \frac{a_1 \cdot Q^{init}}{P(x, y)} \qquad (12)$$

$$\frac{\sum (Q(x, y))^p}{X \cdot Y} = (Q^{init})^p \qquad (13)$$

where $a_1$ is a constant, which can be obtained by equation (13). Using equation (13) is to normalize the quantization steps into an appropriate range, so that the bitrates used with ROI is close to that without ROI. With Equation (13), the proposed method can be easily integrated with a rate-control scheme, which controls the parameter $Q^{init}$. p is an exponential parameter and it can depend on the local contents of video, $P^{va}$ and the size of R.

Figure 4:
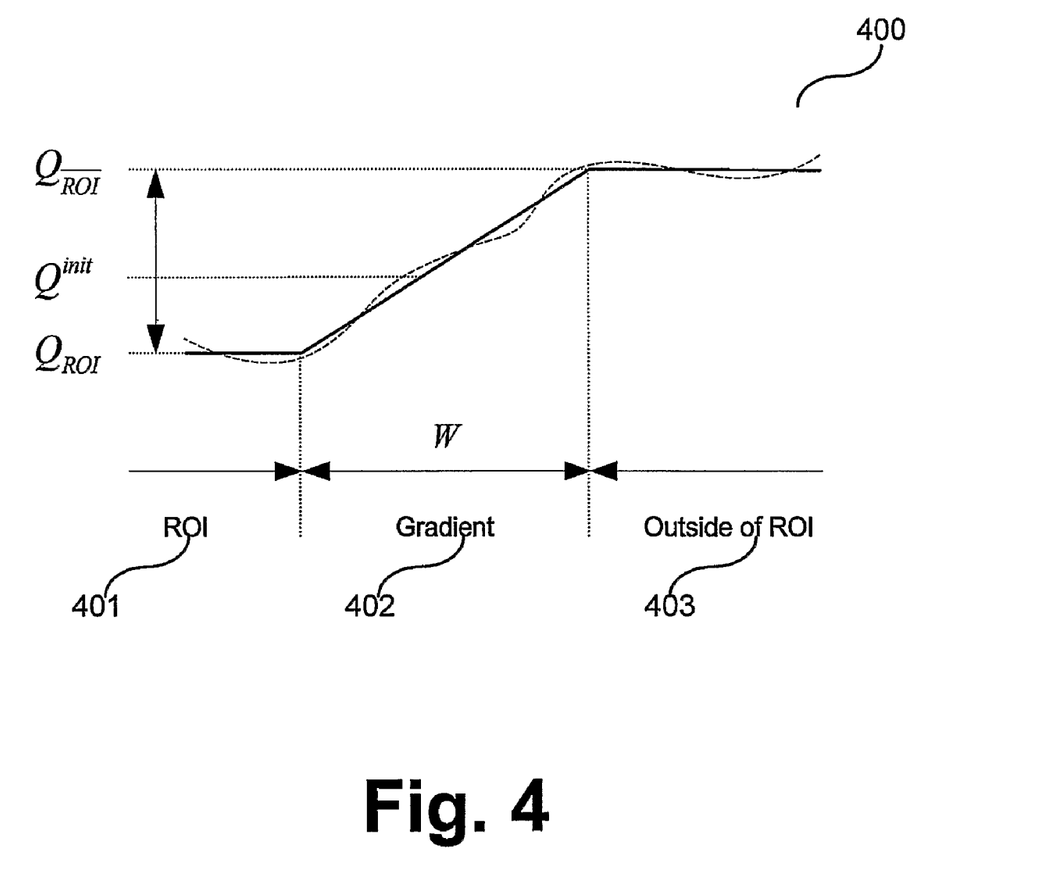
FIG. 4 shows an example of a linear gradient function for quantization parameter adjustment according to an embodiment of the invention.

FIG. 4 shows an example of a linear gradient function 400 for quantization parameter adjustment according to an embodiment of the invention.

Analogously to the diagrams shown in FIG. 2, the location on the picture changes in the horizontal direction. The region of interest is illustrated by a first area 401, the gradient belt is illustrated by a second area 402, the outside of the region of interest is illustrated by a third area 403. In the vertical direction, the magnitude of Q changes.

The dashed line denotes the actual Q distribution adjusted by rate control.

In the case that a Wavelet transform is performed according to step 106, a perceptual ROI-based shifting scheme for Wavelet-based Video/Image Compression is performed:

Let S(x, y) denote the shifting value corresponding to the image location given by the coordinates (x, y). Because the bitrates are controlled by truncation value, S(x, y) is simply chosen according to $$S(x,y) = P(x,y). \qquad (14)$$

Q(x, y) or P(x, y) can be also used to control the mode decision and the precision of motion vectors in motion estimation (step 104) to gain a better perceptual quality of decompressed video or image. The control also follows the rule: more computational resource should be allocated to the region of interest.

An example for a known mode decision is the mode decision according to H.264: the mode decision process exhaustively searches for the best mode for 4×4 blocks to minimize the rate-distortion cost:

$$J(s,c,\text{mode}/Q,\lambda_{mode}) = SSD(s,c,\text{mode}/Q) + \lambda_{mode} \cdot R(s,c,\text{mode}/Q) \qquad (15)$$

where Q is the 16×16 macroblock quantization parameter; the Lagrangian multiplier is expressed as $\lambda_{mode} = 0.85 \cdot 2^{Q/3}$, SSD (s, c, •) means the sum of the squared difference between the original 4×4 luminance block denoted by s and its reconstruction c, and R(•) represents the number of bits associated with the chosen mode. However, the mode selection method cost a lot of resources.

In most applications, fast mode selection techniques are used instead according to the encoding method illustrated in FIG. 1. P(x, y) is used as an input to fast mode selection to control the resources allocation.

With a local ROI-adjusted. Q(x, y), the mode decision can be perceptually optimized.

The local ROI-adjusted Q(x, y) can be also used to control the precision of motion vector. With a number of pre-defined thresholds $Q_i^{threshold}$, i=1, ..., N and $Q_i^{threshold} < Q_{i+1}^{threshold}$, the precision of motion vector can be decided as:

$$\text{Precision} = \begin{cases} \text{one-eighth pixel} & : Q(x, y) \leq Q_1^{threshold} \\ \text{quater-pixel} & : Q_1^{threshold} < Q(x, y) \leq Q_2^{threshold} \\ \text{half-pixel} & : Q_2^{threshold} < Q(x, y) \leq Q_3^{threshold} \\ \text{pixel} & : Q_3^{threshold} < Q(x, y) \end{cases} \qquad (16)$$

Generally, when Q(x, y) is big and the quality is not good, the precision of motion vectors may be reduced to save computational resources.

Besides Q(x, y), PQSM values also can be used to determine the motion vector precisions:

$$\text{Precision} = \begin{cases} \text{pixel} & : P(x, y) \leq P_1^{threshold} \\ \text{half-pixel} & : P_1^{threshold} < P(x, y) \leq P_2^{threshold} \\ \text{quater-pixel} & : P_2^{threshold} < P(x, y) \leq P_3^{threshold} \\ \text{one-eighth pixel} & : P_3^{threshold} < P(x, y) \end{cases} \qquad (17)$$

Or, local bits allocation also can be used in equation (16) to replace Q(x, y). Local bits allocation can be expressed as:

$$B(x, y) = R \frac{P^\beta(x, y)}{\sum P^\beta(x, y)} \qquad (18)$$

Further possible applications include:
1. ROI-adjusted Q(x, y), or P(x, y), or B(x, y) to control the maximal search range in motion estimation. A smaller Q(x, y) or bigger P(x, y) gives a larger maximal search range.

2. Using Q(x, y), or P(x, y), or B(x, y) to adjust fast motion estimation. Generally, more computational resources should be put into low Q(x, y) and P(x, y) areas.
3. Using Q(x, y), or P(x, y), or B(x, y) to adjust motion estimation termination threshold. One example of the estimation of threshold is given by:

$$T_m = \frac{\alpha_T^P \cdot A \cdot C \cdot Q^{init}}{P(x, y)} \quad (19)$$

or $$T_m = \alpha_T^Q \cdot A \cdot C \cdot Q(x, y) \quad (20)$$

or $$T_m = \alpha_T^B \cdot A \cdot C \cdot B(x, y) \quad (21)$$

where A is the number of pixels in a block for motion estimation, C is the measure of local complexity, $\alpha_T^P$, $\alpha_T^Q$ and $\alpha_T^B$ are pre-defined parameters.

In the current Scalable Video Coding (SVC) scheme, spatial scalability is achieved by 2D spatial transforms and temporal scalability is achieved by motion compensated temporal filtering (MCTF), while the entropy coding controls quality scalability. To improve the efficiency of MCTF, variable block size motion alignment with Rate-Distortion Optimization (RDO) is used. In the proposed scheme, the Lagrangian Multiplier $\lambda_{SVC}$ is obtained by P(x, y).

$$\lambda_{SVC}(x,y) = \lambda^{init} \cdot f_{SVC}(P(x,y), B) \quad (22)$$

where $\lambda_{SVC}(x, y)$ represents a local Lagrangian Multiplier on location (x,y), and B is the target bitrate. $f_{SVC}()$ is a decreasingly monotonous function to P(x, y): when P(x, y) is high, its output is small, and vice versa. $f_{SVC}()$ can be a nonlinear or linear function.

Further, a perceptual ROI-based Unequal Error Protection Scheme can be used in the encoding method. Unequal Error Protection (UEP) was proposed for fading channel video/image communication. The basic idea is to give more bits to more sensitive contents in stream for better protection. Let $R_{header}^{init}$, $R_{mv}^{init}$ and $R_{residual}^{init}$ denote the initial punctured convolutional codes (PCCs) for header, motion vector and residual, respectively. The contents can be differentiated more precisely. $R_j(x, y)$ can be expressed as:

$$R_j(x,y) = R_j^{init} \cdot f_{UEP_j}(P(x,y)) \quad (23)$$

where j can be 'header', 'motion vector' and 'residual'. $f_{UEP_j}()$ can be a decreasingly monotonous nonlinear or linear function. When P(x, y) is high, $R_j(x, y)$ is low to give a better protection.

P(x, y) also can be used to control the temporal sampling rate, or framerate. Assume the outside ROI sampling rate is $f_{\overline{ROI}}$, and the ROI sampling rate is:

$$f_{ROI} = \begin{cases} 2 \cdot f_{\overline{ROI}} & : P_1^{threshold} < P(x, y) \leq P_2^{threshold} \\ 3 \cdot f_{\overline{ROI}} & : P_2^{threshold} < P(x, y) \leq P_3^{threshold} \\ \vdots & \end{cases} \quad (24)$$

where $P_n^{threshold}$, n=1, 2, 3, ... are pre-defined thresholds.

Figure 5:
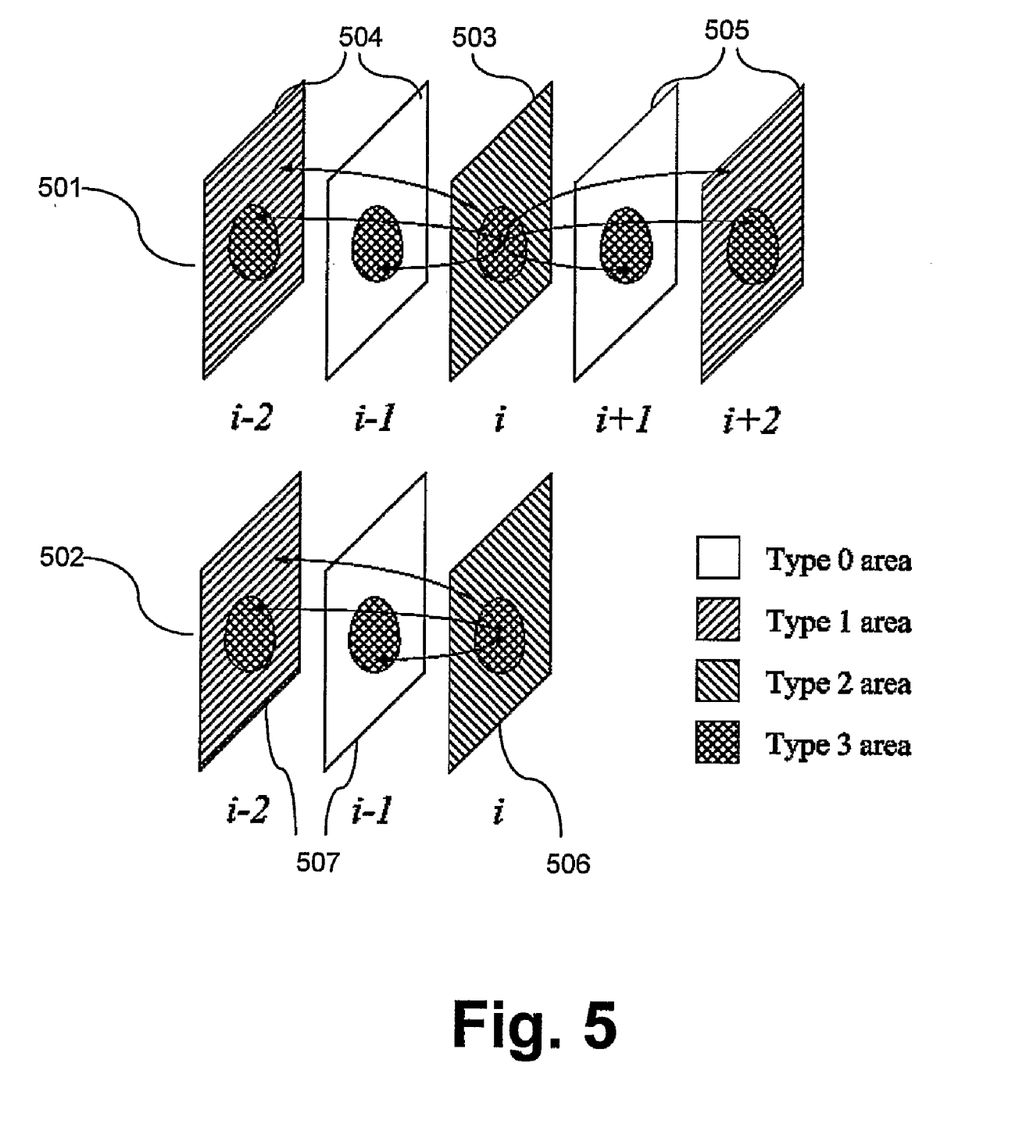
FIG. 5 shows a first diagram and a second diagram illustrating motion estimation.

FIG. 5 shows a first diagram 501 and a second diagram 502 illustrating motion estimation.

In the first diagram 501, an ith frame 503 is shown which is bidirectionally motion estimated using preceding frames 504 and subsequent frames 505.

In the second diagram 502, an ith frame 506 is shown which is bidirectionally motion estimated using preceding frames 507.

In this case, n=2. Because some areas are discarded and cannot be used for motion estimation, a labeling technique is be used to label the available searching areas. In the example shown in FIG. 5, type 1 areas in frames numbered i±n·j (j=1, 2, 3, ... ) and type 3 areas in frames numbered i±k (k=1, 2, 3, ... ) are labeled for motion estimation, and type 0 areas cannot be used as references in motion estimation.

For type 3 areas P(x, y)>$P_1^{threshold}$ holds and for type 1 areas P(x, y)≦$P_1^{threshold}$ holds.

The simplified PQSM P(x, y) can be replaced by the local bits allocation B(x, y).

The labeling technique can be extended to n≧3 conditions.

In one embodiment, the above mentioned ROI-based perceptual content-adaptive video/image communication schemes are applied to scalable video/image communication directly. Moreover, in one embodiment, P(x, y) is used to control spatial scalability and SNR scalability.

In this case, the motion coding is such that it is compatible with the spatial scalability in the ROI. In other words, each spatial resolution has an independent motion vector field (MVF) in the ROI. Each motion vector field is generated by rate distortion optimization (RDO) with the utilization of the corresponding $Q_{ROI}$. However, the motion coding may not be compatible with the spatial scalability out of the ROI, i.e. two or more than two spatial resolutions may share one motion vector field out of the ROI. The motion vector field at low resolution can also be derived from that at high resolution out of the ROI. Moreover, motion vector field and residual image are always matched in the ROI while there may be mismatch between motion vector field and residual image out of the ROI.

Let $L_i$, i=1, 2, ... denote each spatial layer, and then $L_{i-1}$ can be either an interpolated low resolution or a sub-region of $L_i$, or a combination of both of them. In the case that $L_{i-1}$ is a sub-region of $L_i$, the generated simplified PQSM, or perceptual ROI, can be used to select the best $L_{i-1}$ by:

$$L_{i-1} = \arg\max_{L_{i-1}} \left( \sum_{(x,y) \in L_{i-1} \subset L_i} P(x, y) \right) \quad (25)$$

The selected $L_{i-1}$ provides the most important spatial information to viewers.

For ROI-based SNR scalability, let U and L denote the upper bound and the lower bound of bit rate range at a fixed spatial level and temporal level. When the bit rate range is wide, i.e. U/L is greater than a threshold θ, and ROI is not supported, two motion vector fields may be required according to prior art. One is generated at low bit rate and the other one is generated at high bit rate.

For ROI-based SNR scalability according to an embodiment of the invention, when $P^{va}$ U/L is greater than the threshold θ, two motion vector fields are required in the ROI. Each motion vector field is generated by RDO with the utilization of the corresponding $Q_{ROI}$. When θ/$P^{va}$≦U/L<θ, an motion vector field may be shared out of the ROI. The motion vector field at low bit rate can also be derived from that at high bit rate out of the ROI. When U/L is greater than the threshold θ, two motion vector fields are required out of the ROI, the motion vector field in the ROI can be further refined.

In other words, one can have up to three motion vector fields in the ROI and two motion vector fields out of ROI in the whole bit rate range. Moreover, motion vector field and residual image are always matched in the ROI where there may be mismatch between motion vector field and residual image out of the ROI.

Actually, a new SNR scalability scheme is also provided for the generatio and coding of motion information by the ROI-based SNR scalability. Specially, each frame is divided into two parts: ROI and out-of-ROI, ROI is assigned a priority $P^{va}>1$. The ROI part can have up to three motion vector fields and out-of-ROI can only have up to two motion vector fields. Overall, one can have up to three motion vector fields for each frame in the whole SNR range.

Similarly, a similar SNR scalability is provided for the generatio and coding of motion information by dividing each frame into $N(N \geq 1)$ parts, which can be described by $(N-1)$ ROIs (multiple ROI). For simplicity, we assume that ROI i has priority $P_i^{va}$, and priority N is the highest one. ROI i($1 \leq i \leq (N-1)$) can have up to $(i+2)$ motion vector fields in the whole bit rate range, and out-of-ROI can only have up to two motion vector fields.

Overall, one has up to $(N+1)$ motion vector fields for each frame in the whole bit rate range.

In this document, the following publications are cited:
[1] Zhongkang Lu, W. S. Lin, E. P. Ong, Susu Yao and S. Rahardja, "Modelling Global modulatory factors in Just-Noticeable-Distortion Estimation", First International Workshop on Video Processing and Quality Metrics for Consumer Electronics, Scottsdale, Ariz., January 2005.
[2] Zhongkang Lu, Lin Weisi, Yao Susu and Ong Eeping, "A method for generating a quality oriented significance map for assessing the quality of an image or video", PCT Patent Application No PCT/SGO2/00259, Patent number WO2004043054.
[3] Nister David and Christopoulos Charilaos, "Method and Device for Lossless Region of Interest Coding", WO9919839.
[4] ISO/ISC JTC 1/SC 29/WG 1 (ITU-T SG8) JPEG2000 Part I Final Committee Draft Version 1.0, March 2000.

The invention claimed is:

1. A method for encoding at least one picture having a first region and a second region wherein
the first region is encoded according to a first encoding scheme,
the second region is encoded according to a second encoding scheme,
the second encoding scheme is carried out taking into account a parameter representing the visual perception of the second region.

2. The method according to claim 1, wherein the first encoding scheme is carried out not taking the parameter into account.

3. The method according to claim 1, wherein the second region is formed by a perceptual region-of-interest representation.

4. The method according to claim 3, wherein a simplified perceptual quality significance map is determined from the perceptual region-of interest representation.

5. The method according to claim 1, wherein quantization parameters used for encoding the second region are adjusted according to the parameter.

6. The method according to claim 5, wherein the quantization step is determined according to the equation $$Q(x, y) = \frac{a_1 \cdot Q^{init}}{P(x, y)},$$

where $a_1$ is a constant, $Q_{init}$ is an initial quantization step and $P(x,y)$ is a simplified perceptual quality significance map.

7. The method according to claim 1, wherein the shifting values used for encoding the second region are adjusted according to the parameter.

8. The method according to claim 7, wherein the shifting values are determined according to the formula $S(x, y)=P(x, y)$ wherein $P(x,y)$ is a simplified perceptual quality significance map.

9. Encoder for encoding a picture with a first region and a second region wherein the encoder comprises
a first encoding unit encoding the first region
a second encoding unit encoding the second region wherein
the second encoding unit takes a parameter representing the visual perception of the second region into account when encoding the second region.

10. A non-transitory computer readable medium storing a program, which, when executed by a computer, makes the computer perform a method for encoding a picture with a first region and a second region wherein
the first region is encoded according to a first encoding scheme
the second region is encoded according to a second encoding scheme
the second encoding scheme is carried out taking a parameter representing the visual perception of the second region into account.

* * * * *